March 13, 1928.

E. F. FORSGARD

DISHWASHING MACHINE

Filed Aug. 16, 1926

March 13, 1928.
E. F. FORSGARD
DISHWASHING MACHINE
Filed Aug. 16, 1926    5 Sheets-Sheet 3
1,662,496
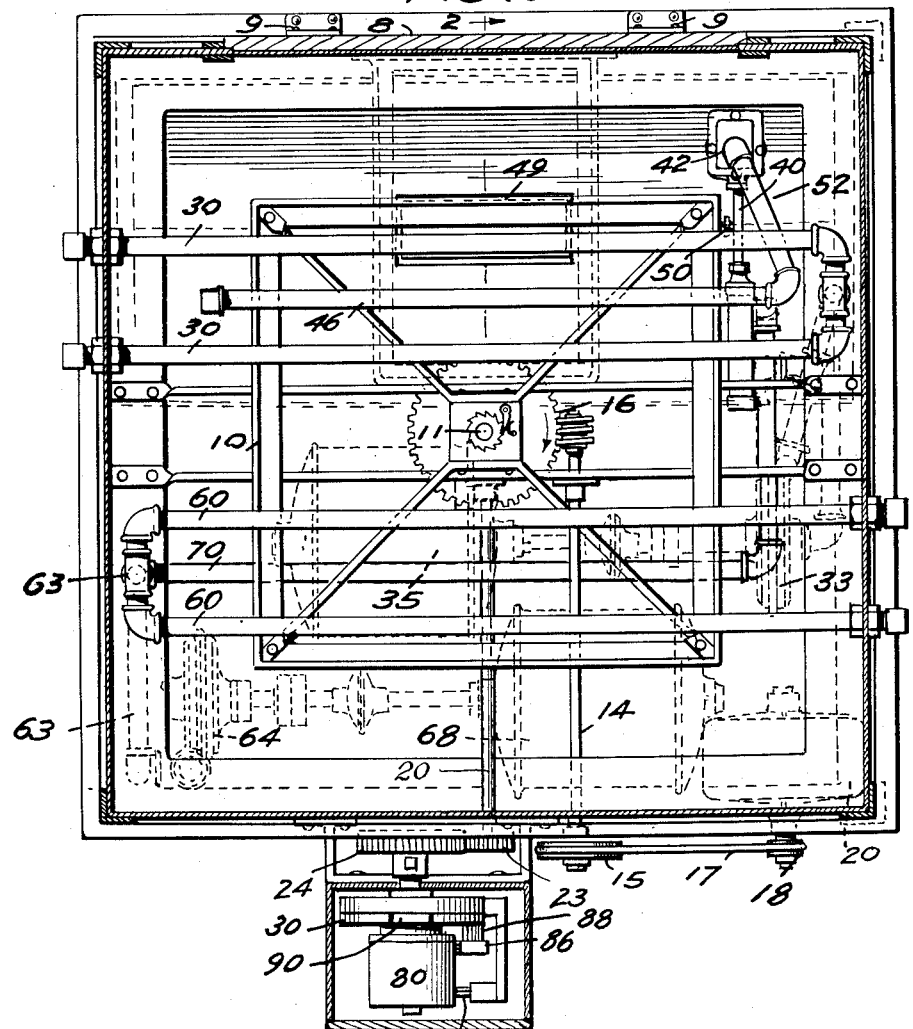
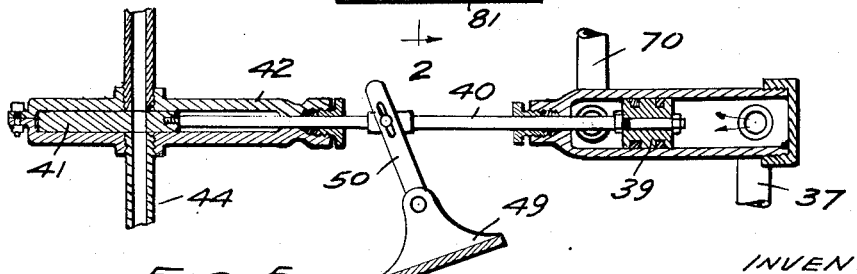

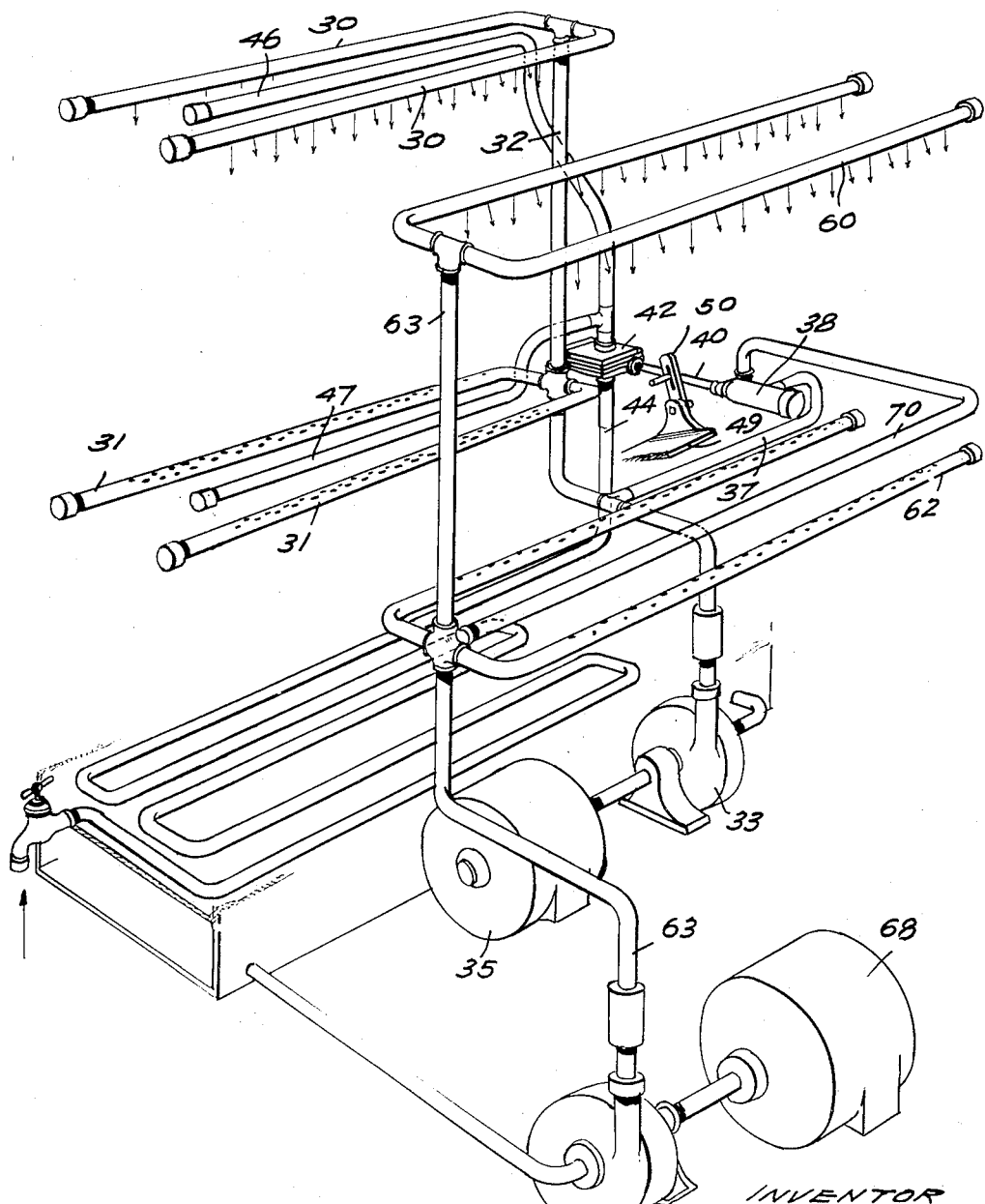

March 13, 1928.
E. F. FORSGARD
DISHWASHING MACHINE
Filed Aug. 16, 1926
1,662,496
5 Sheets-Sheet 5
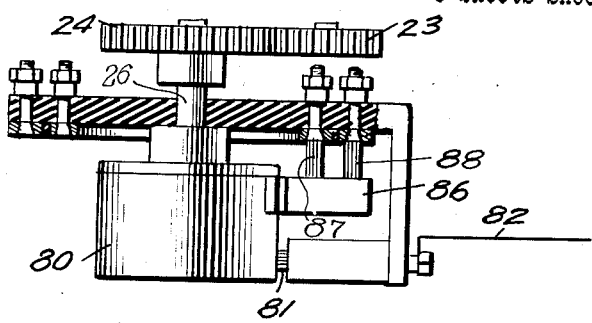
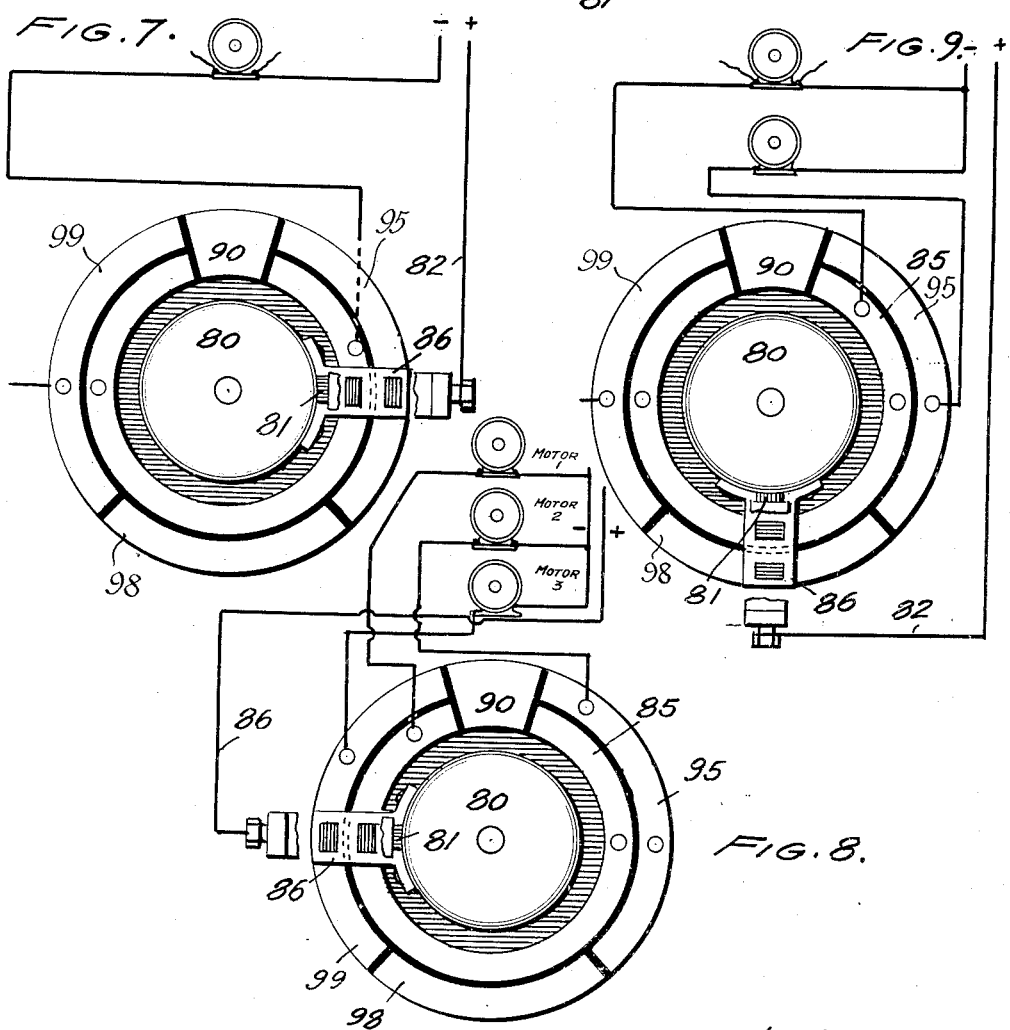

Patented Mar. 13, 1928.

1,662,496

UNITED STATES PATENT OFFICE.

EDWARD F. FORSGARD, OF WACO, TEXAS.

DISHWASHING MACHINE.

Application filed August 16, 1926. Serial No. 129,572.

This invention relates to dishwashing machines especially adapted for small restaurant, boarding-house and cafeteria use, although not in any sense restricted to such use.

Briefly stated an important object is to provide a dish-washing machine which may be economically operated by one man and which, by reason of the compact arrangement of parts, will occupy but a small amount of space in a kitchen or other place.

A further and equally important object is to provide novel means whereby the supply of various cleaning, rinsing and sterilizing waters are automatically controlled so that the operator is relieved of the necessity of manually controlling the water supplies.

Other objects and advantages will be apparent during the course of the following description.

In the accompanying drawings forming a part of this application and in which like numerals are employed to designate like parts throughout the same, Figure 1 is a perspective of the improved dishwashing machine.

Figure 3 is a horizontal sectional view taken on line 3 of Figure 2.

Figure 4 is a perspective illustrating the means by which the various streams of water are supplied to the dishes during the cleaning of the same.

Figure 5 is a sectional view illustrating the manner in which several controlling members embodied in the invention are operated.

Figure 6 is a fragmentary plan view illustrating a timer embodied in the invention.

Figure 7 is a diagram illustrating the manner in which the supply of current to the main motor is controlled.

Figure 8 is a diagram illustrating the manner in which the separate pumping motors for the cleaning and sterilizing waters are supplied with current.

Figure 9 is a diagram illustrating the manner in which the three separate motors embodied in the invention are electrically connected to the timer.

Figure 1:
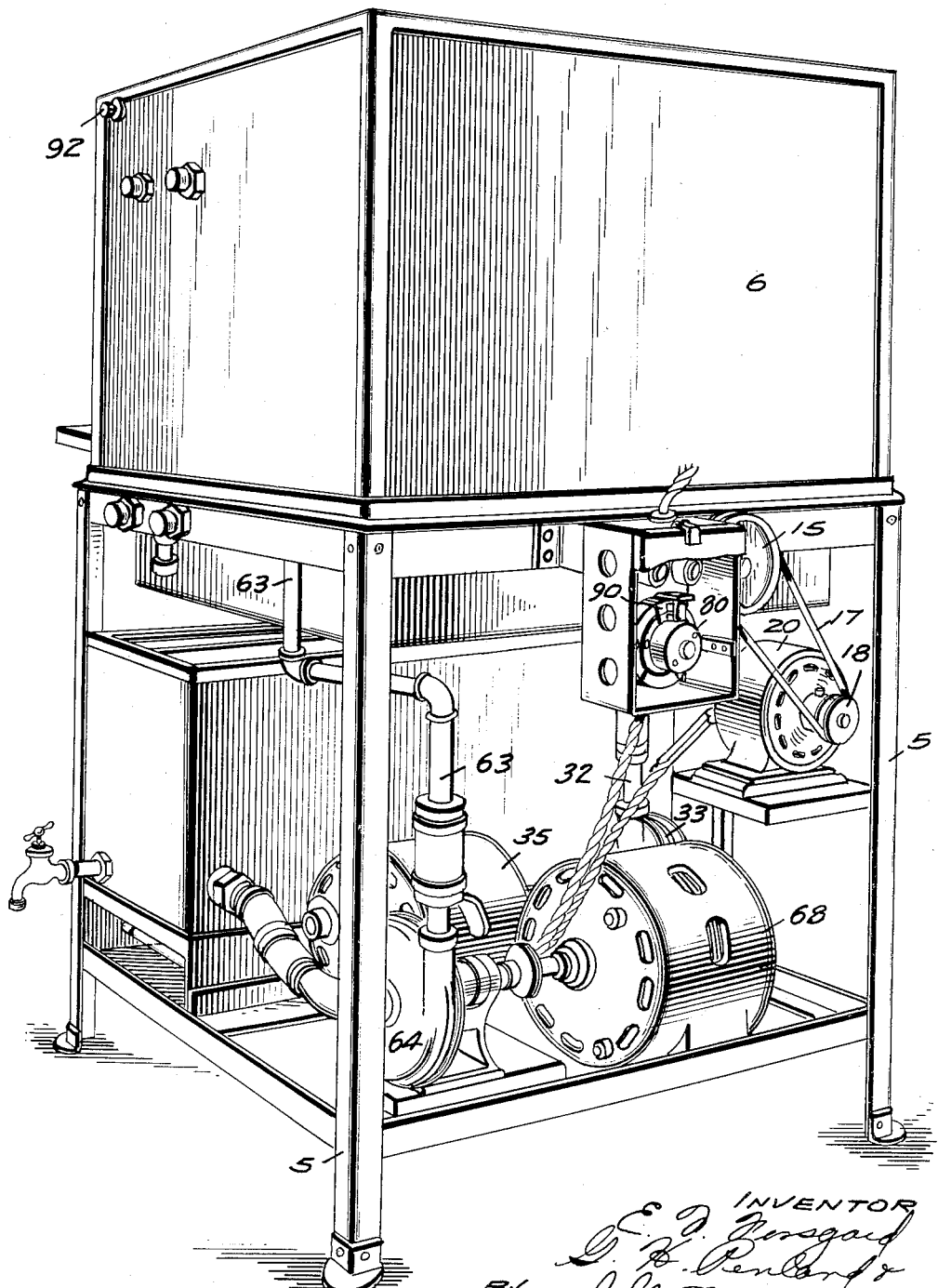

In the drawing wherein for the purpose of illustration is shown a preferred embodiment of the invention the numerals 5 designate the legs or the corners of a framework upon which the mechanism of the improved dishwashing machine is mounted.

The dishwashing compartment or cabinet is designated by the numeral 6 and, as shown in Figure 1, is more or less rectangular in shape, the shape of the compartment forming no especial part of the invention.

Figure 2:
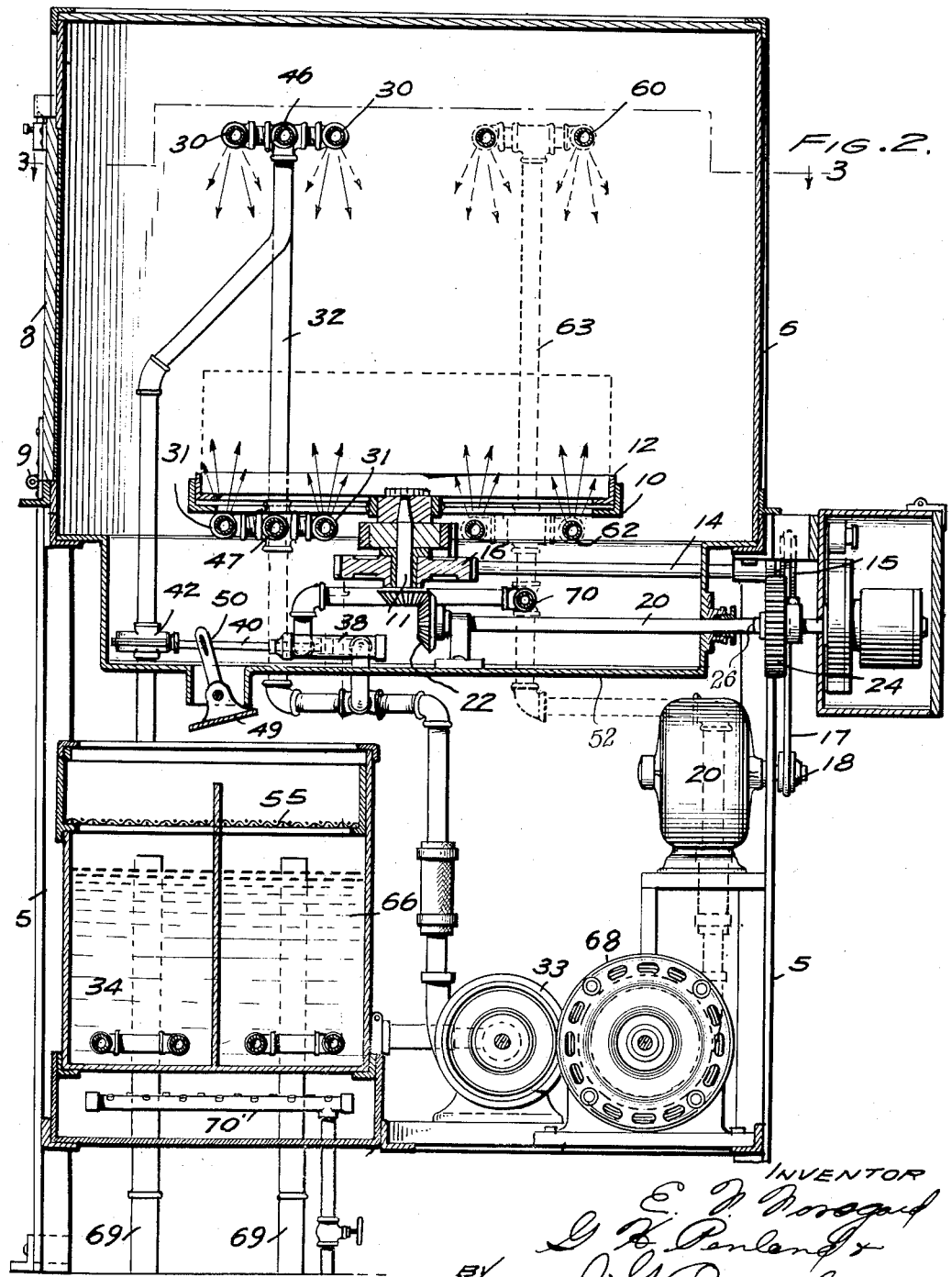
Figure 2 is a vertical sectional view through the same.

Figure 2 illustrates that the front of the cabinet or compartment 6 is provided with a door 8 horizontally hinged at the lower edge thereof as indicated at 9 so that the door may swing downwardly to give access to the interior of the cabinet.

Figure 2 also illustrates that a rotatable support 10 is mounted within the cabinet and is provided with a hub having a conical opening for the reception of the tapered upper portion of a shaft 11. It is thus seen that the frame 10 merely rests upon the shaft 11 and that the weight of the frame and the dishes is sufficient to hold the hub of the frame in driving engagement with the shaft 11. A dish-tray 12 may be detachably mounted on the frame 10 and since the tray 12 is smaller in diameter than the width of the opening for the door 8, it is a simple matter to remove the tray 12 or to insert the same.

In carrying out the invention a shaft 14 is geared to the vertical shaft 11 through the medium of a worm and gear connection designated at 16 so that turning of the shaft 14 by means to be described will result in the turning of the frame 10 and the dishes carried thereby at a proper speed. The shaft 14 has one end provided with a pulley 15 about which a belt 17 is trained, the belt also being trained about the pulley 18 of the armature shaft of a main operating motor 20 by which the frame 10 is turned and by which the timing of the various water streams is controlled as will be described.

Figure 2 illustrates that the lower portion of the shaft 11 and the inner portion of a timing shaft 20 are geared together as indicated at 22, so that the turning of the shaft 11 results in the turning of the shaft 20. The outer end of the shaft 20 is, as shown in Figure 3, provided with a spur-gear 23 in constant mesh with a second spur-gear 24, the ratio between the gears 23 and 24 preferably being five to one. The gear 24 is rigidly secured to the shaft 26 of a timer, the purpose of the timer being to control the supply of current to the pumping motors as will be described.

Coming now to the supply of the first cleaning water it is pointed out that the discharge pipes for this water are designated by the numerals 30 and 31, these pipes being above and below the dishes as will be obvious from an inspection of the drawing, particularly Figure 2. The pipes 30 and 31 are connected to a main discharge pipe 32 extending from a centrifugal or other pump 33. The pump 33 is supplied with water from a water tank 34 adapted for the reception of hot soapy water. In carrying out the invention the electric motor 35 is operatively connected to the pump 33 and when the motor is energized the pump will be operated to draw water from the container 34 and supply the water to the dishes through and the medium of the discharge pipes 30 and 31. When the motor 35 is de-energized the pump 33 will, of course, cease to function and the supply of soapy water to the dishes will be cut off.

Attention is now directed to the fact that the main supply pipe 32 for the soapy water is provided with a branch and bypass 37, having connection with a cylinder 38 at one end of the piston 39 therein.

Thus during the operation of the pump 33 a pressure will be built up in the branch pipe 37, so that the piston 39 is moved to the extreme position shown in Figure 5.

When the piston 39 and the rod 40 of the same is thus moved to an extreme position a valve 41 operating within a casing 42 is moved to open position so that a hot rinsing water from an outside source may travel through the supply pipe 44 and discharge onto the dishes through the rinsing spraypipes 46 and 47 above and below the dishes.

Therefore the rinsing water from the branches 46 and 47 will be supplied to the dishes simultaneously with the supply of soapy water thereto and it is important to note that the supply of rinsing water will continue for a predetermined period after the supply of soapy water has ceased. This is accounted for by the fact that when the motor 35 is deenergized the supply of water by way of the pump 33 will be cut off but the slide valve 41 having been moved to open position will remain in this position until mechanically moved to closed position by a means to be described.

Attention is again directed to Figure 5 which illustrates that a water control plate or deflector 49 is operatively connected to the piston rod 40 through the medium of a lever 50 and when the piston rod is moved to the extreme position shown in Figure 4 the deflector 49, which is carried by a trough-shaped bottom or drain 52, is positioned to direct the drippings from the dishes into the container 34 for the soapy water. This feature of the invention is fully illustrated in Figure 2 and it will be seen that since the rinsing and the soapy waters are supplied simultaneously the supply of water in the container 34 is replenished by the water discharged from the rinsing pipes 46 and 47. As previously stated the pipes 46 and 47 have connection with an outside source of supply so that the water discharged from these pipes onto the dishes is employed to replenish the supply of water in the container 34. A soap container 55 is carried by the main water tank and has a perforated bottom so that the drippings from the dishes may flow over the soap in the soap container and back into the water container 34. The member 55 also serves as a collector for matter washed from the dishes.

Subsequent to the supply of rinsing water a sterilizing water is supplied to the dishes by upper and lower spray pipes 60 and 62 respectively, these spray pipes having connection with a main pipe 63 which, as clearly shown in Figure 4, extends from a centrifugal or other fluid pump 64. The pump 64 has connection with a container 66 for the sterilizing water so that when the pump is operated by the electric motor 68 the sterilizing water will be drawn from the container 66 and supplied to the dishes by way of the discharge pipes 60 and 62. This is the final operation in the cleaning process and it will be seen that during the entire period of water supply the dishes will be rotating between sprays so that all matter on the dishes will be thoroughly removed.

Attention is again directed to the valve 49 illustrated in Figure 5. In this connection it is pointed out that the sterilizing pipe 63 is provided with a branch 70 having connection with the cylinder 38 at the end opposite the point of connection of the pipe 37, so that when the flow of sterilizing water is set up the piston will be moved away from the position shown in Figure 5 and the supply of rinsing water through the pipe 44 will be cut off and the valve 49 will be positioned to direct the water from the dishes back into the container 66. Thus when the cleaning, rinsing and sterilizing of the dishes has been completed the slide valve 41 will be in a closed position, so that by no chance can water travel through the pipe 44 until the valve 41 is again moved to open position by the renewal of the supply of soapy water.

If desired the pipe 44 which, as previously stated, extends from an outside source may be coiled as suggested in Figure 2 so that the water in the containers or compartments 34 and 66 is heated. Of course, such an arrangement is based on the assumption that the water supplied to the pipe 44 is preheated.

Overflow pipes 69 may be extended into the water containers 34 and 66.

However, if no hot water supply is available a gas burner 70 may be employed to heat, not only the water in the containers 34 and 66, but the water in the coiled portion of the pipe 44.

The supply of current to the various motors is controlled by the timer illustrated in Figures 6 to 8 inclusive, wherein it is shown that an insulated rotor 80 is mounted on the shaft 26 and the copper or other conducting surface of the same is engaged by the brush 81 having connection with one side 82 of the electric line. Another current conductor may be connected to the arcuate contact 85 having connection with the starting and main motor 20 as suggested in Figure 8. Referring now to Figure 6 it will be seen that the insulated rotor 80 is provided with a radial bracket 86 having brushes 87 and 88, the brush 87 being adapted to engage the arcuate contact 85 whereby to complete the circuit through the starting motor 20. It will be seen that there is a dead spot between the ends of the arcuate contact 85 and it is upon this dead spot that the brushes 87 and 88 rest when the machine completes the cycle of operation. To move the brushes 87 and 88 off the dead spot 90, it is merely necessary for the operator to touch a small starting switch 92 as suggested in Figure 1. This starting switch has electrical connection with the motor 20 so that the motor may be started and the shaft 26 turned over a sufficient number of times to bring the contact 87 into engagement with the arcuate contact 85, whereupon the flow of current from the motor 20 continues until the brush 87 again moves on to the dead spot 90.

When the machine is started, as described, the brush 88 will move onto the contact 95 so that current is supplied to the motor 35 whereby soapy water is supplied to the dishes. However, the contact 95 is substantially shorter than the contact 85 and the supply of soapy water continues for only a limited period. When the contact 88 moves beyond the contact 95 the supply of soapy water will cease, but the supply of rinsing water from an outside source will continue and it is during this period that the brush 88 moves over an insulated portion 98 of the timer.

After the brush 88 moves beyond the dead portion 98 of the timer, it will move onto an arcuate contact 99 having a connection with the motor 68 by means of which the pump 64 for the sterilizing water is operated. When the brush 88 is thus engaged with the contact 99, the supply of sterilizing water will be brought about, and will continue until the brush 88 moves onto the dead spot 90. This completes the cycle of operation and the dishes may now be removed.

Having thus described the invention, what is claimed is:

1. A dishwashing machine comprising a plurality of fluid discharge members having connection with sources of supply, pumping units for pumping the fluid from certain of the sources of supply to said discharge members, and means whereby the flow of fluid through one of the discharge members is controlled by a flow of fluid through the other discharge members.

2. A dishwashing machine comprising a plurality of separate fluid discharge members, one of which has connection with an outside source of supply, means whereby a flow of fluid may be set up through those discharge members not connected directly with the outside source of supply, and fluid pressure operated means for controlling the fluid discharge member connected to the outside source of supply.

3. A dishwashing machine comprising separate containers, spray members having connection with said containers, pumps interposed between said spray members and said containers, said pumps being adapted to set up a fluid pressure in said spray members, a spray member having connection with an outside source of supply, and a valve controlling said spray member having connection with an outside source of supply and having means operated by the fluid under pressure in said first-named spray members.

4. A dishwashing machine comprising a discharge member for a cleaning fluid, a second discharge member for a rinsing fluid and having a valve, a piston actuated by the pressure of the fluid in the first-named discharge member and having connection with said valve, whereby the pressure of the fluid in the discharge member for the cleaning fluid controls said valve.

5. A dishwashing machine comprising separate containers for cleaning and sterilizing waters, discharge members having connection with said separate containers, a supply member for a rinsing fluid and having a valve, a cylinder having connection with the discharge members for the cleaning and sterilizing fluids and having a piston connected to said valve, whereby the movement of fluid through said discharge members for the cleaning and sterilizing fluid controls said valve.

6. A dishwashing machine comprising separate containers for cleaning and sterilizing fluids, discharge members having connection with said separate containers, a supply member for a rinsing fluid and having a valve, a cylinder communicating at opposite ends thereof with the discharge members for the cleaning and sterilizing fluids and having a piston connected to said valve, whereby the movement of fluid through said discharge members for the cleaning and sterilizing fluid controls said valve, pumps having connection with the discharge members for the cleaning and sterilizing fluids, and a water deflector having means to direct the drippings into either of said containers and having operative connection with said piston.

7. A dishwashing machine comprising separate containers for cleaning and sterilizing waters, discharge members having connection with said separate containers, a supply member for a rinsing fluid and having a valve, a cylinder having connection with the discharge members for the cleaning and sterilizing fluids and having a piston connected to said valve, whereby the movement of fluid through said supply members for the cleaning and sterilizing fluid controls said valve, pumps having connection with the discharge members for the cleaning and sterilizing fluids, means whereby said pumps may be operated, and a rotatable dish-supporting member having connection with said means to operate the same.

8. A dishwashing machine comprising separate containers for cleaning and sterilizing fluids, discharge members having connection with said separate containers, a supply member for a rinsing fluid and having a valve, a cylinder having connection with the discharge members for the cleaning and sterilizing fluids and having a piston connected to said valve, whereby the movement of fluid through said discharge members for the cleaning and sterilizing fluid controls said valve, and a movable member adjacent said containers and adapted to direct the fluid from the dishes into either of the containers, there being means whereby the same is connected to said piston.

9. A dishwashing machine comprising a plurality of discharge members, a cylinder having communication with said discharge members and having a piston provided with a rod, a fluid conduit provided with a valve having connection with and controlled by said rod.

10. A washing machine comprising a discharge member for a cleaning fluid, a fluid supply member having a valve, a cylinder in communication with said discharge member and having a piston responsive to the fluid pressure in said discharge member, there being means connecting said piston and said valve.

11. A dishwashing machine comprising discharge members, a supply member having a valve, a cylinder having communication with said discharge members and having a piston connected to said valve whereby the movement of fluid through said discharge members controls said valve, pumps having connection with the discharge members, and a deflector in the path of the drippings from the dishes and having connection with said piston.

12. A dishwashing machine comprising a plurality of discharge members, separate sources of supply for said discharge members, a cylinder having communication with said discharge members and having a piston provided with a rod, a fluid conduit provided with a valve having connection with and controlled by said rod, and a fluid directing member having connection with said rod and adapted to direct the drippings from the dishes separately into said sources of supply.

13. A washing machine comprising a discharge member for a fluid, a cylinder in communication with said discharge member and having a piston moved in one direction by the fluid in said discharge member and cylinder, a second fluid conduit having a valve connected to said piston, and means to move the piston and the valve connected thereto in the other direction.

14. A washing machine comprising a discharge member for a fluid, a cylinder in communication with said discharge member and having a piston moved in one direction by the fluid in said discharge member and cylinder, a second fluid conduit having a valve connected to said piston, means to move the piston and the valve connected thereto in the other direction, a drain having a discharge, and a fluid deflector having operative connection with said piston and being in the path of travel of the fluid from said discharge and movable by said piston to direct the fluid into different courses.

In testimony whereof I affix my signature.

EDWARD F. FORSGARD.